United States Patent
Anumalasetty et al.

(10) Patent No.: US 9,571,585 B2
(45) Date of Patent: Feb. 14, 2017

(54) USING ALTERNATE PORT NAME FOR UNINTERRUPTED COMMUNICATION

(71) Applicant: International Business Machines Corporation, Armonk, NY (US)

(72) Inventors: Kiran K. Anumalasetty, Bangalore (IN); Yadagiri Rajaboina, Hyderabad (IN); Sanket Rathi, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 223 days.

(21) Appl. No.: 14/089,896

(22) Filed: Nov. 26, 2013

(65) Prior Publication Data
US 2015/0149998 A1 May 28, 2015

(51) Int. Cl.
G06F 3/06 (2006.01)
H04L 29/08 (2006.01)
G06F 9/455 (2006.01)

(52) U.S. Cl.
CPC .............. *H04L 67/141* (2013.01); *G06F 3/06* (2013.01); *G06F 9/45558* (2013.01); *G06F 2009/4557* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 6,988,130 B2 | 1/2006 | Blumenau et al. | |
| 7,281,062 B1 | 10/2007 | Kuik et al. | |
| 7,467,191 B1 * | 12/2008 | Wang et al. | 709/221 |
| 7,836,332 B2 * | 11/2010 | Hara | G06F 3/0607 714/5.11 |
| 7,912,051 B1 | 3/2011 | Rowlands et al. | |
| 7,970,852 B2 | 6/2011 | Allen et al. | |
| 8,041,987 B2 | 10/2011 | Allen et al. | |
| 8,073,899 B2 | 12/2011 | Grier et al. | |
| 8,341,308 B2 | 12/2012 | Allen et al. | |
| 8,407,702 B2 | 3/2013 | Ikegaya et al. | |

(Continued)

OTHER PUBLICATIONS

Dubois et al., "Live Partition Mobility for Oracle RAC", IBM Systems and Technology Group IBM Oracle Center, Mar. 27, 2012 <http://www.ibm.com/support/techdocs.

(Continued)

*Primary Examiner* — Emerson Puente
*Assistant Examiner* — Jonathan R Labud
(74) *Attorney, Agent, or Firm* — Brian M. Restauro; Nicholas Cadmus

(57) ABSTRACT

In a method for communicating in a computing environment, a first computer establishing communication with a first virtual computer through a first virtual port using a primary port name for the first virtual port, wherein the first virtual computer is executing on a second computer. The first computer acquires an alternate port name for the first virtual port from the first virtual computer executing on the second computer. The first computer determines that the first virtual computer is not accessible using the primary port name for the first virtual port, wherein the first virtual computer is migrated to execute on a third computer. The first computer establishes communication with the first virtual computer executing on the third computer using the alternate port name of the first virtual port.

11 Claims, 5 Drawing Sheets

(56) References Cited

U.S. PATENT DOCUMENTS

| | | |
|---|---|---|
| 8,429,446 B2 | 4/2013 | Hara et al. |
| 2002/0161852 A1* | 10/2002 | Allen et al. .................. 709/217 |
| 2006/0242312 A1 | 10/2006 | Crespi et al. |
| 2010/0115131 A1* | 5/2010 | Eisenhauer et al. .......... 709/245 |
| 2013/0024718 A1 | 1/2013 | Mewhinney et al. |
| 2013/0097295 A1 | 4/2013 | Garza et al. |
| 2015/0150000 A1 | 5/2015 | Anumalasetty et al. |

OTHER PUBLICATIONS

Lynch, "Planning for Virtualization on Power", St. Louis CMG, Nov. 16, 2010, Powerpoint Presentation, Forsythe.

Maciel, "PowerVM: Virtualization without limits", IBM Power Systems, copyright 2012 IBM Corporation.

The Powerlinux Community, "Migrating active partitions using Live Partition Mobility", retrieved onNov. 25, 2013 from website: <https://www.ibm.com/developmerworks/community/wikis/home?lang=>.

Tutorials, "IBM migration dynamic partitioning (Live Partition Mobility) technology—an overview", retrieved on Nov. 25, 2013 from website: <http://www.tutorials.com/os/aix/ibm-migration-dynamic-partitioning>.

\* cited by examiner (BEFORE PARTITION MOVED)

| BYTE \ BIT | 7 | 6 | 5 | 4 | 3 | 2 | 1 | 0 |
|---|---|---|---|---|---|---|---|---|
| 0 | \multicolumn{4}{c}{0h (PERIPHERAL QUALIFIER)} | | | 3h (PERIPHERAL DEVICE TYPE) | | |
| 1 | 83h (PAGE CODE) ||||||||
| 2..3 | 10h (LENGTH) ||||||||
| 4..11 | WWPN1 ||||||||
| 12..19 | WWPN2 ||||||||

FIG. 2

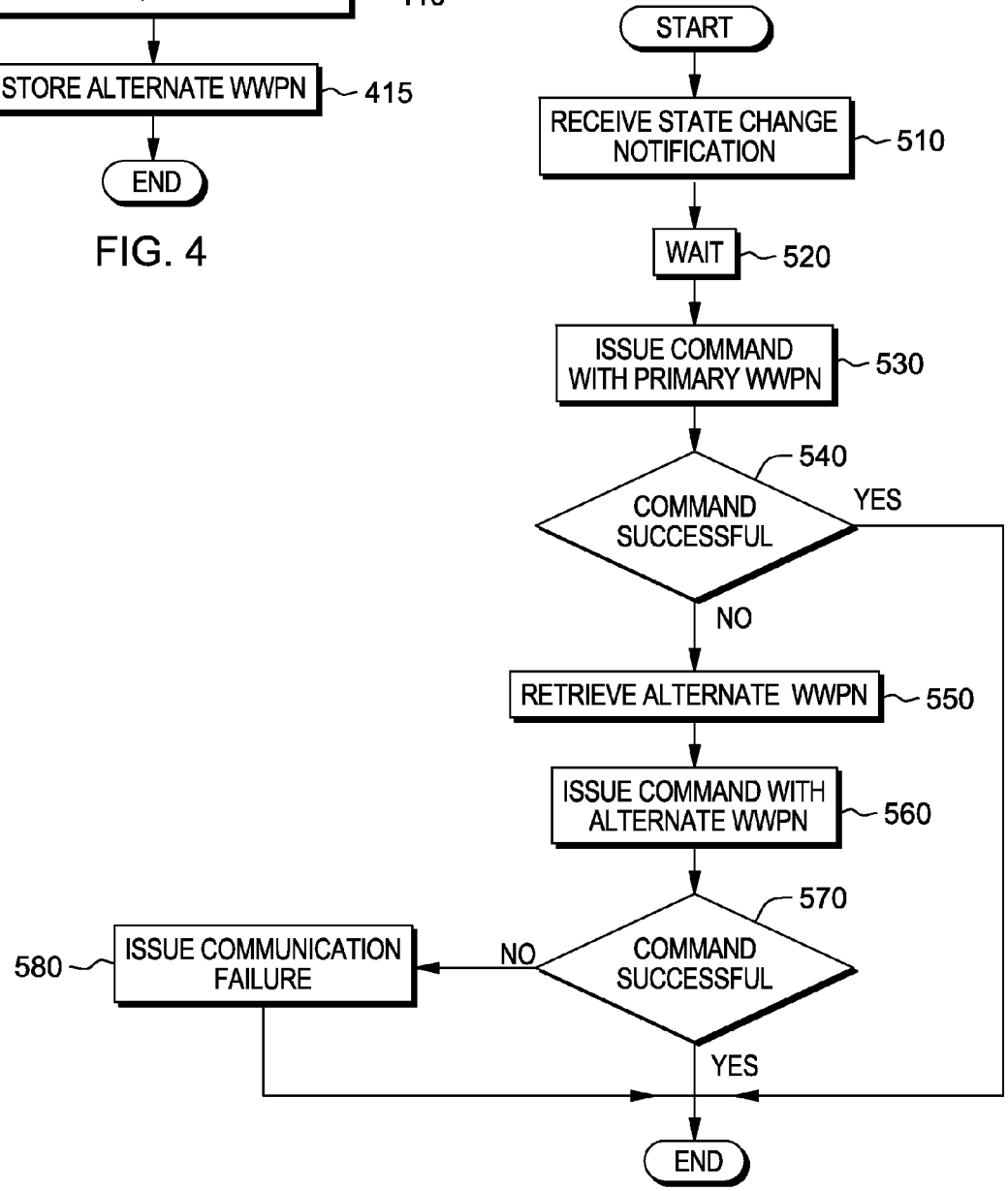

USING ALTERNATE PORT NAME FOR UNINTERRUPTED COMMUNICATION

FIELD OF THE INVENTION

The present disclosure relates generally to the field of computer virtualization, and more particularly to communication with logical partitions.

BACKGROUND OF THE INVENTION

System virtualization creates multiple virtual systems from a single physical system. The physical system can be a stand-alone computer, or alternatively, a computing system utilizing clustered computers and components. Virtual systems are independent operating environments that use virtual resources made up of logical divisions of physical resources such as processors, memory and input/output (I/O) adapters. System virtualization is typically implemented through hypervisor technology. Hypervisors, also called virtual machine managers, use a thin layer of code in software or firmware to achieve fine-grained, dynamic resource sharing.

The hypervisor provides the ability to divide physical system resources into isolated logical partitions (also referred to as LPARs). Each logical partition operates like an independent system running its own operating environment (i.e., a virtual system). The hypervisor can allocate dedicated processors, I/O adapters, and memory to each logical partition. The hypervisor can also allocate shared processors to each logical partition. More specifically, the hypervisor creates virtual processors from physical processors, so that logical partitions can share the physical processors while running independent operating environments.

In addition to creating and managing the logical partitions, the hypervisor manages communication between the logical partitions via a virtual switch. To facilitate communication, each logical partition may have a virtual adapter for communication between the logical partitions, via the virtual switch. The type of the virtual adapter depends on the operating environment used by the logical partition. Examples of virtual adapters include virtual Ethernet adapters, virtual Fibre Channel adapters, virtual SCSI adapters, and virtual serial adapters.

Virtual adapters are often implemented through a Virtual I/O Server (VIOS). A VIOS manages physical I/O adapters (Fibre Channel disks, Ethernet, or CD/DVD optical devices). Other logical partitions controlled by the hypervisor are considered "clients" or Virtual I/O Clients (VIOCs) to the VIOS. The VIOS provides virtual Fibre Channel adapters and shared Ethernet capability to client logical partitions. The VIOS allows logical partitions to access SAN disks (or resources) using virtual Fibre Channel adapters mapped to a physical adapter which supports N_Port ID Virtualization (NPIV).

A storage area network (SAN) is a dedicated network that provides access to consolidated block-level data storage. SANs are primarily used to make storage devices, such as disk arrays, tape libraries, and optical jukeboxes, access to servers so that the devices appear like locally attached devices to the operating system. A SAN typically has its own network of storage devices that are generally not accessible through the local area network by other devices.

One of the activities in a complex environment is the transfer of a migration of one logical partition to another logical partition. Two reasons for a migration include: resource balancing and a logical partition does not have enough resources while another system does.

SUMMARY

Aspects of an embodiment of the present invention disclose a method, computer program product, and computing system for communicating in a computing environment. The method includes a first computer establishing communication with a first virtual computer through a first virtual port using a primary port name for the first virtual port, wherein the first virtual computer is executing on a second computer. The method further includes the first computer acquiring an alternate port name for the first virtual port from the first virtual computer executing on the second computer. The method further includes the first computer determining that the first virtual computer is not accessible using the primary port name for the first virtual port, wherein the first virtual computer is migrated to execute on a third computer. The method further includes the first computer establishing communication with the first virtual computer executing on the third computer using the alternate port name of the first virtual port.

BRIEF DESCRIPTION OF THE SEVERAL VIEWS OF THE DRAWINGS

FIG. 2 is an example of an extended vital product data page, in accordance with one embodiment of the present invention.

FIG. 4 is a flowchart depicting the steps of a store alternate WWPN program, in accordance with one embodiment of the present invention.

FIG. 5 is a flowchart depicting the steps of an engage alternate WWPN program, in accordance with one embodiment of the present invention.

DETAILED DESCRIPTION

Figure 1:
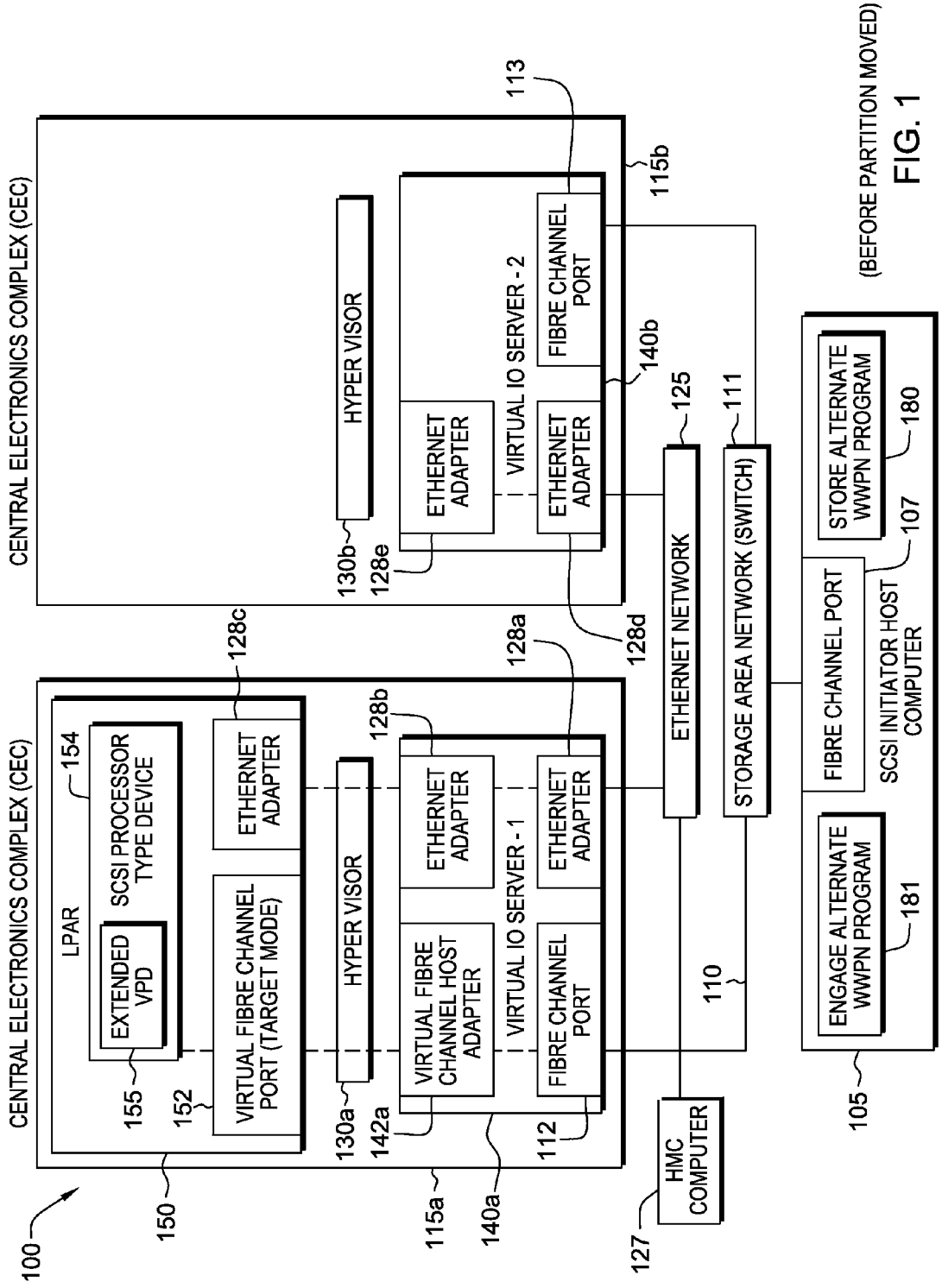
FIG. 1 is a diagram of a network infrastructure before a logical partition migration, in accordance with one embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. The following Figures provide an illustration of one embodiment. The embodiment, taken in part or in whole, does not imply any limitations with regard to the environments in which different embodiments may be implemented.

FIG. 1 is a diagram of a network infrastructure 100 before a logical partition migration, in accordance with one embodiment of the present invention. Network infrastructure 100 includes: small computer system interface (SCSI) initiator host computer 105, fibre channel port 107, storage area network (SAN) 110, storage area network (SAN) switch 111, fibre channel port 112, fibre channel port 113, central electronics complex (CEC) 115a, central electronics complex (CEC) 115b, ethernet network 125, hardware management console (HMC) computer 127, ethernet adapter 128a, ethernet adapter 128b, ethernet adapter 128c, ethernet adapter 128d, and ethernet adapter 128e, hypervisor 130a, hypervisor 130b, virtual I/O server (VIOS) 140a, virtual I/O server (VIOS) 140b, virtual fibre channel host 142a, logical partition (LPAR) 150, virtual fibre channel port 152, SCSI processor type device 154, extended vital product data (VPD) page 155, store alternate WWPN program 180, and engage alternate WWPN program 181. In various embodiments, network infrastructure 100 may include additional CECs or other devices not shown.

Each component in FIG. 1 will now be discussed in-turn from the perspective of moving a logical partition from CEC 115a to CEC 115b. CECs will be discussed shortly. A migration of one logical partition installed on one CEC to another CEC requires that the running state (memory, registers, and so on) of the logical partition that is migrated (sometimes referred to as the "source partition" or "mobile partition") is transferred to the other CEC.

In the depicted embodiment, SCSI initiator host computer 105 is connected to SAN 110 through fibre channel port 107. SCSI initiator host computer 105 can be any device that embodies a conventional computer system, as described later in FIG. 6. In the relationship between computers with SCSI FC host bus adapters, one computer is called an initiator, because it initiates the connection to one or more SCSI target devices. SCSI initiator host computer 105 is the endpoint that initiates and sends SCSI commands. Conversely, a SCSI target is the endpoint that does not initiate sessions, but instead waits for initiators' commands and provides required input/output data transfers. In various embodiments there may be several SCSI initiator hosts which are referred to as a cluster. SCSI initiator host computer 105 contains store alternate WWPN program 180 and engage alternate WWPN program 181, to be discussed shortly.

Fibre channel port 107 is a Host Bus Adapter (HBA) interface card. The term Host Bus Adapter is often used to refer to a Fibre Channel interface card. Fibre channel port 107 is SAN 110 endpoint connection with SCSI initiator host computer 105. An endpoint connection will either receive a SCSI command or send a SCSI command, depending on whether it is connected to an initiator or a target. In the depicted embodiment, fibre channel port 107 sends SCSI commands, as fibre channel port 107 is connected to SCSI initiator host computer 105. A simplified explanation of the communication is that a client, SCSI initiator host computer 105, is asking for information from a SCSI target through a fibre channel network (e.g. SAN 110). SCSI initiator host computer 105 communicates with the fibre channel network via fibre channel port 107.

In one embodiment, SAN 110 is connected to fibre channel port 107, fibre channel port 112 (on CEC 115a) and fibre channel port 113 (on CEC 115b). Fibre channel port 107 is a Host Bus Adapter (HBA) interface card endpoint connection point to SAN 110. Fibre channel port 112 and fibre channel port 113 are the Host Bus Adapter (HBA) interface cards, which are endpoint connection points on their respective CECs to SAN 110. In storage networking terminology, a SAN is a high-speed sub-network that provides access to storage devices. SANs allow storage devices be available to all devices on a network. SANs provide logical partitions access to storage devices, so that the storage devices appear like locally attached devices to the operating system. Examples of storage device are disk arrays, tape libraries, and optical jukeboxes. In some embodiments, a storage area network is referred to as a "fabric" or a "SAN fabric." In the depicted embodiment, SAN 110 contains SAN switch 111. SAN switch 111 is a Fibre Channel network switch which is compatible with the Fibre Channel protocol.

Two CECs, CEC 115a and CEC 115b, are depicted in FIG. 1. A CEC contains computer hardware (e.g. processors, disk drives, networking adapters, etc.) and software (hypervisors, Virtual I/O Servers, application software). Various components of CEC 115a and CEC 115b can each be involved in a partition migration. For example, hypervisor 130a works in concert with the HMC computer 127 to migrate LPAR 150 to CEC 115b. Examples of CECs include application servers, such as a server that provides information on airline reservations. In the depicted embodiment, CEC 115a initially contains the source logical partition, LPAR 150. After the migration is complete, CEC 115b contains LPAR 150 (labeled as LPAR 350 in FIG. 3).

HMC computer 127 controls administrator initiation and setup of the subsequent migration command sequences that allow migration of logical partitions. HMC computer 127 provides both a graphical user interface (GUI) wizard and a command-line interface to control migration. HMC computer 127 controls the logical partition migration from CEC 115a to CEC 115b, and thus interacts with hypervisor 130a and hypervisor 130b, VIOS 140a and VIOS 140b, and LPAR 150 and LPAR 350.

In another embodiment, network infrastructure 100 contains multiple HMC computers. For example, the source partition is managed by one HMC computer and the destination partition is managed by a different HMC computer. In various embodiments, HMC computers are connected to the same network, so that HMC computers can communicate with each other.

In one embodiment, ethernet network 125 is connected to HMC computer 127, VIOS 140a (via ethernet adapter 128a), and VIOS 140b (via ethernet adapter 128d). Ethernet network 125 is the roadway by which HMC computer 127 communicates with all Virtual I/O Servers and by which a logical partition, such as LPAR 150, is moved between CEC. As someone skilled in the arts would recognize, ethernet network is a family of computer networking technologies for local area networks (LANs). Ethernet network 125 can be any of the network models that would constitute an ethernet network, which include, but is not limited to: (i) token ring; (ii) fast ethernet; (iii) gigabit ethernet; (iii) 10 gigabit ethernet; and (iv) fiber distributed data interface (FDDI).

Ethernet adapter 128a and ethernet adapter 128d are physical Ethernet adapters on CEC 115a and CEC 115b, respectively. Ethernet adapter 128b, ethernet adapter 128c, and ethernet adapter 128e, are virtual Ethernet adapters. Ethernet adapter 128b and ethernet adapter 128c are running on CEC 115a. Ethernet adapter 128e is running on CEC 115b. Ethernet adapters, physical and virtual, provide the necessary network connectivity for the partition migration through the Virtual I/O Servers.

Hypervisor 130a is running in CEC 115a. Hypervisor 130b is running in CEC 115b. Migration requires hypervisor support from each hypervisor to transfer a logical partition's state. For instance, the hypervisors track changes to the transferring partition memory state during migration to the new CEC (CEC 115b).

CEC 115a contains VIOS 140a. CEC 115b contains VIOS 140b. In the depicted embodiment, VIOS 140a and VIOS 140b both include N_Port ID Virtualization (NPIV) server adapter device driver software. VIOS facilitates the sharing of physical I/O resources among logical partitions. For instance, VIOS provides sharing of physical I/O resources for logical partitions.

LPAR 150 contains a fully functional operating system, such as a Linux-like operating system. LPAR 150 contains virtual fibre channel port 152 and extended VPD page 155. Virtual fibre channel port 152 supports target mode. In the depicted embodiment, LPAR 150 is the logical partition to be moved from CEC 115a to CEC 115b.

Virtual fibre channel port 152 provides communication between LPAR 150 and VIOS 140a through virtual fibre channel host 142a. Virtual fibre channel host 142a can function in target mode which is used to send and receive messages to/from Fibre Channel ports on other hosts. Virtual Fibre channels and shared Ethernet adapters are interfaces by which logical partitions can access the physical I/O adapters. As a result, logical partitions can share SCSI devices, fibre channel adapters, Ethernet adapters, and expand the amount of memory available to logical partitions. A Virtual Fibre channel port is referred to by a World Wide Port Name (WWPN), which is unique to each port. A Virtual Fibre channel port is assigned a pair of WWPNs when created, which are referred as primary WWPN (WWPN1) and alternative WWPN (WWPN2). The WWPN is available to the SCSI initiator host when the SCSI initiator host logs into a SAN switch and thus allowing the SCSI initiator host computer 105 the means to communicate with the LPAR through the Virtual Fibre channel port. In the depicted embodiment, virtual fibre channel port 152 is referred to by World Wide Port Name 1 (WWPN1).

SCSI processor type device 154 is contained within LPAR 150. In the depicted embodiment, SCSI processor type device 154 is a SCSI target. A SCSI processor device is a target device with the characteristics of a primary computing device. A SCSI processor device receives or provides packets of data as requested by the initiator. In a SCSI processor device, the target accepts and provides the data packets transferred according to the commands from the initiator. The communication protocol between an initiator and a target details: rules by which information is exchanged, how the exchange information is interpreted by a SCSI processor device, and when it is allowable to exchange the information.

Extended VPD page 155 holds vendor specific data. Extended VPD page 155 is later described in detail with reference to FIG. 2. SCSI initiator host computer 105 communicates with virtual fibre channel port 152 using WWPN1. After partition migration, SCSI initiator host computer 105 may lose communication with the migrated virtual fibre channel port. SCSI initiator host 105 can communicate with the migrated virtual fibre channel port by using an alternate WWPN. In the depicted embodiment, the alternate WWPN is referred to as World Wide Port Name 2 (WWPN2).

SCSI initiator host computer 105 contains store alternate WWPN program 180 and engage alternate WWPN program 181. Store alternate WWPN program 180 is invoked before the logical partition migration in order to capture the alternate WWPN. Engage alternate WWPN program 181 is invoked after the logical partition migration and uses the alternate WWPN to re-establish communication with the migrated LPAR.

FIG. 2 is an example of extended vital product data (VPD) page 155, in accordance with one embodiment of the present invention. The extended vital product data page holds vendor specific data. Both WWPN1 and WWPN2 are contained in extended VPD page 155. A WWPN is retrieved by SCSI initiator host computer 105 by sending an inquiry command to SCSI processor type device 154 and subsequently reading the data in the returned page. An example of an inquiry command is "SCSI INQUIRY." WWPN1 and the WWPN2 are assigned while creating virtual fibre channel port 152 (see FIG. 1).

In extended VPD page 155, row 201 shows bytes 4 through 11 (reference 201) which contain WWPN1. In extended VPD page 155 row 203 shows bytes 12 through 19 (reference 203) which contain WWPN2. WWPNs consist of 16 hexadecimal digits grouped in eight pairs. WWPNs are written with colon characters as delimiters. An example of a WWPN is "10:00:00:00:c9:22:fc:01."

Figure 3:
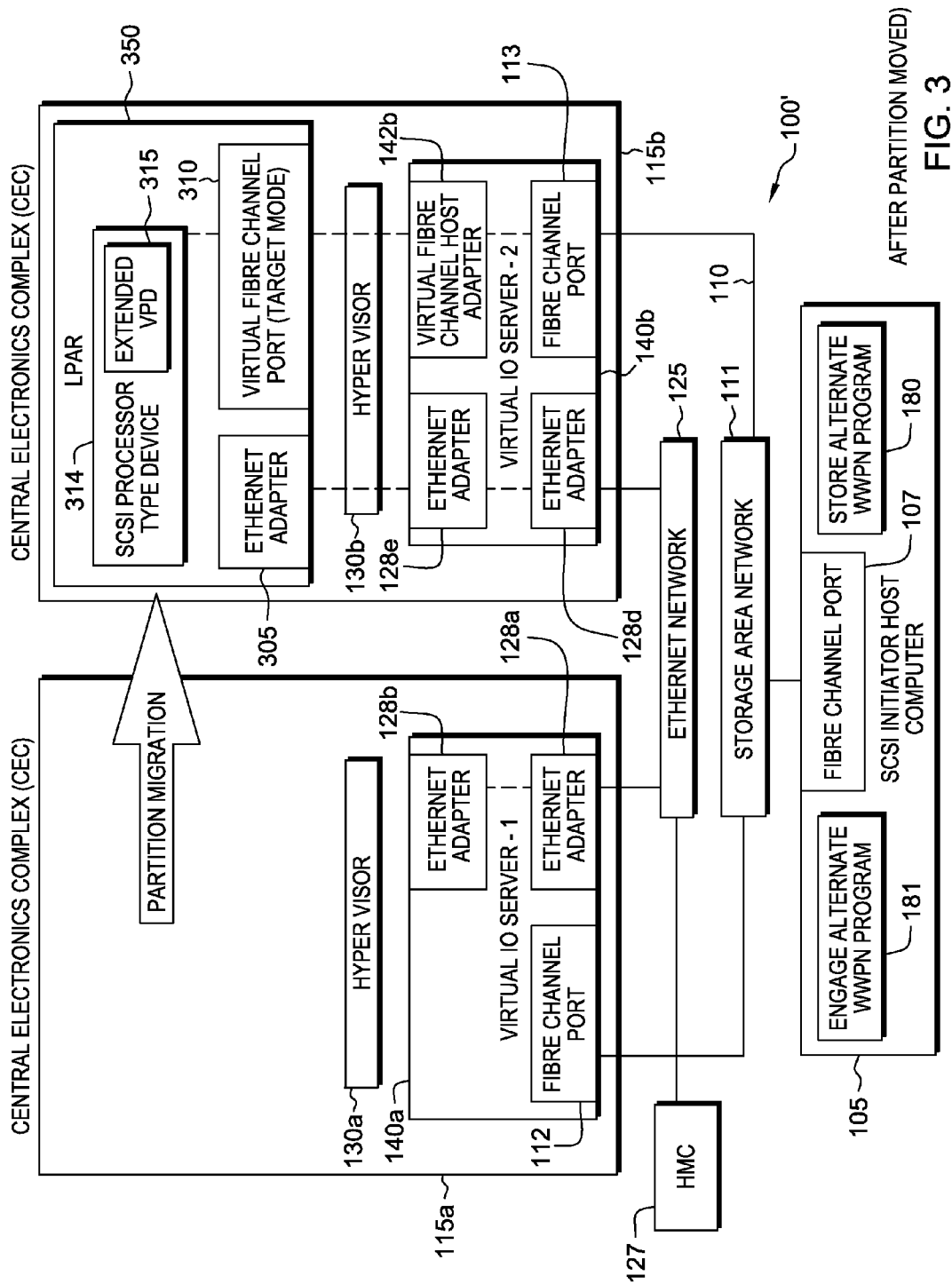
FIG. 3 is a diagram of a network infrastructure after a logical partition migration, in accordance with one embodiment of the present invention.

FIG. 3 is a diagram of a network infrastructure 100' after a logical partition migration, in accordance with one embodiment of the present invention. Network infrastructure 100' includes: small computer system interface (SCSI) initiator host computer 105, fibre channel port 107, storage area network (SAN) 110, storage area network (SAN) switch 111, fibre channel port 112, fibre channel port 113, central electronics complex (CEC) 115a, central electronics complex (CEC) 115b, ethernet network 125, HMC computer 127, ethernet adapter 128a, ethernet adapter 128b, ethernet adapter 128d, and ethernet adapter 128e, hypervisor 130a, hypervisor 130b, virtual I/O server (VIOS) 140a, virtual I/O server (VIOS) 140b, store alternate WWPN program 180, and engage alternate WWPN program 181, as described in reference to FIG. 1. Additionally, network infrastructure 100' includes: virtual fibre channel host adapter 142b, ethernet adapter 305, virtual fibre channel port 310, SCSI processor type device 314, extended VPD page 315, logical partition (LPAR) 350.

Network infrastructure 100' depicts the state of CEC 115a and CEC 155b after migration of LPAR 150 (see FIG. 1) to LPAR 350. The running state (memory, registers, and so on) of LPAR 150 is migrated intact to LPAR 350. Ethernet adapter 128c is migrated to ethernet adapter 305. Virtual fibre channel port 152 is migrated to virtual fibre channel port 310. SCSI processor type device 154 is migrated to SCSI processor type device 314. Extended VPD page 155 is migrated to extended VPD page 315. As there are two available WWPNs per virtual fibre channel port, the virtual fibre channel port switches between WWPNs on each move. Whenever a logical partition is migrated to another CEC the virtual fibre channel port uses the WWPN that is not in use. In the depicted embodiment, after migration of LPAR 150, SCSI initiator host computer 105 cannot communicate with virtual fibre channel port 310, because SCSI initiator host computer 105 is using the old, in this case primary, WWPN for virtual fibre channel port 152, WWPN1.

FIG. 4 is a flowchart depicting the steps of store alternate WWPN program 180, in accordance with one embodiment of the present invention. Store alternate WWPN program 180 is contained in SCSI initiator host computer 105. Store alternate WWPN program 180 is invoked before the migration process in order to capture the alternate WWPN, WWPN2, for virtual fibre channel port 152. Store alternate WWPN program 180 is invoked either by an administrator or automatically by software running at the SCSI initiator host computer 105. In other embodiments, where there are multiple SCSI initiator hosts, each SCSI initiator host would each contain their copy of store alternate WWPN program 180.

In step 410, store alternate WWPN program 180 issues a SCSI inquiry command to the SCSI target, SCSI processor type device 154. The SCSI inquiry command, generated by store alternate WWPN program 180, travels over SAN 110 to VIOS 140a, which passes the command to virtual fibre channel port 152, and subsequently to SCSI processor type device 154. The SCSI inquiry command is requesting the SCSI target data contained in extended VPD page 155. SCSI processor type device 154 responses by sending back data contained in extended VPD page 155 out virtual fibre channel port 152 to VIOS 140a, which sends data contained in extended VPD page 155 over SAN 110, and subsequently to store alternate WWPN program 180.

In step 415, store alternate WWPN program 180 stores the alternate WWPN, WWPN2, for use after LPAR 150 is migrated. WWPN2 can be stored in memory, such as a file, that is immediately accessible by SCSI initiator host computer 105 and by engage alternate WWPN program 181.

FIG. 5 is a flowchart depicting the steps of engage alternate WWPN program 181, in accordance with one embodiment of the present invention. Engage alternate WWPN program 181 is contained in SCSI initiator host computer 105. Engage alternate WWPN program 181 is invoked after the migration process in order to use the alternate WWPN, WWPN2, in an attempt to establish communicate between SCSI initiator host computer 105 and LPAR 350. Engage alternate WWPN program 181 is invoked either by an administrator or automatically by software running on SCSI initiator host computer 105. In other embodiments, where there are multiple SCSI initiator hosts, each SCSI initiator host would each contain their copy of engage alternate WWPN program 181.

In step 510, engage alternate WWPN program 181 receives a state change notification. The state change notification is sent out by SAN switch 111 whenever there is a change in a connection. For example, whenever a logical partition is rebooted, reconfigured, or moved, a state change notification is sent to everyone who has registered to receive changes. SCSI initiator host computer 105 would have sent a notification to SAN switch 111 to receive state change notification when it first came on-line.

In step 520, engage alternate WWPN program 181 waits a time period before attempting to re-establish communication with the virtual fibre channel port and the logical partition. The time period is sufficient enough to allow the network infrastructure to quiescence to a steady communication status. The time period may be 100 milliseconds to several seconds, as someone skilled in the arts would recognize.

In step 530, engage alternate WWPN program 181 issues a (request—Labeled as command on drawing) to SAN 111 switch to get the port identifier for the SCSI target. The SCSI target, in this embodiment, being contained within LPAR 350, as virtual fibre channel port 310, which supports target mode. The issued command can be in the form of a Get Port Identifier (GID_PN) command with a parameter of WWPN1. It is possible that the logical partition has lost communication temporary and is attempting to use the last known WWPN to communication. SCSI initiator attempts to re-establish communication using the last known WWPN for the SCSI target.

In decision step 540, engage alternate WWPN program 181 determines if the command to SAN switch 111 to get the port identifier for the SCSI target was successful. If the SCSI target has registered with SAN switch 111 with the primary WWPN (WWPN1 in the depicted embodiment), the command will probably succeed. If the command was not successful engage alternate WWPN program 181 takes the no "N" path and moves to step 550. If the request was successful, engage alternate WWPN program 181 takes the yes "Y" path and terminates.

In step 550, engage alternate WWPN program 181 retrieves the alternate WWPN (WWPN2 in the depicted embodiment). WWPN2 is stored in memory, such as a file, that is immediately accessible by engage alternate WWPN program 181.

In step 560, engage alternate WWPN program 181 issues a command to SAN 111 switch to get the port identifier for the SCSI target. The issued request can be in the form of a Get Port Identifier (GID_PN) command with a parameter of WWPN2. If the SCSI target has registered with SAN switch 111 with the alternate WWPN (WWPN2 in the depicted embodiment), the command will probably succeed. The SCSI initiator attempts to re-establish communication using the alternate WWPN, WWPN2.

In decision step 570, engage alternate WWPN program 181 determines if the command to SAN switch 111 to get the port identifier for the SCSI target was successful. If the request was not successful engage alternate WWPN program 181 takes the no "N" path and moves to step 580. If the command was successful engage alternate WWPN program 181 takes the yes "Y" path and terminates, as now the migrated partition can communicate with SCSI host initiator computer 105.

In step 580, engage alternate WWPN program 181 communicates with an administrator that SCSI host initiator computer 105 has loss communication with the LPAR 350. The communication can be in the form of a command-line error message.

Figure 6:
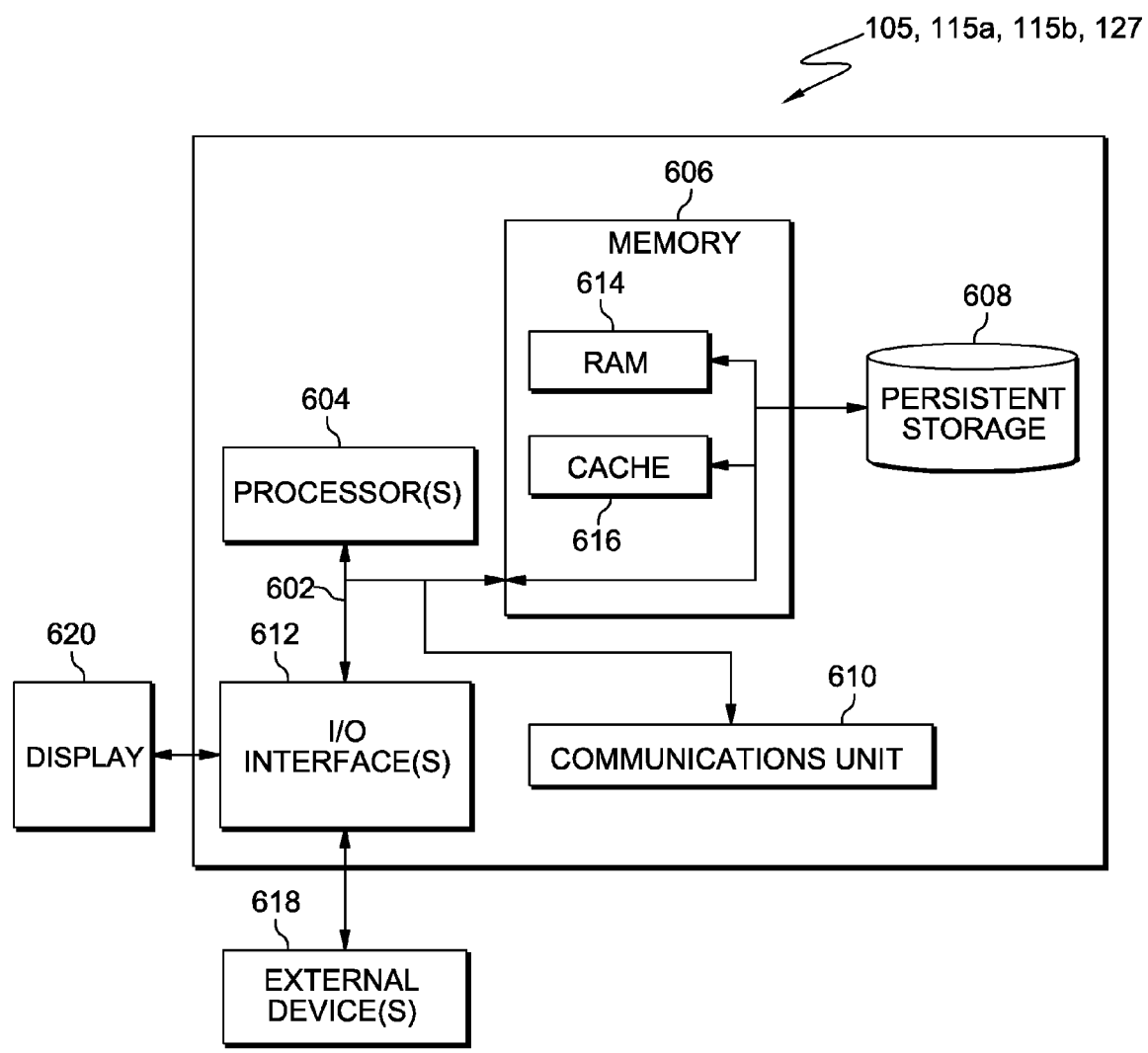
FIG. 6 depicts a block diagram of components of the computers of FIG. 1 and FIG. 3, in accordance with one embodiment of the present invention.

FIG. 6 depicts a block diagram of components of computers SCSI initiator host computer 105, CEC 115a, CEC 115b, and HMC computer 127, in accordance with one embodiment of the present invention. It should be appreciated that FIG. 6 provides only an illustration of one implementation and does not imply any limitations with regard to the environments in which different embodiments may be implemented. Many modifications to the depicted environment may be made.

SCSI initiator host computer 105, CEC 115a, CEC 115b, and HMC computer 127 each include communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 614 and cache memory 616. In general, memory 606 can include any suitable volatile or non-volatile computer-readable storage media.

Store alternate WWPN program 180 and engage alternate WWPN program 181 are stored in persistent storage 608, of SCSI initiator host computer 105, for execution and/or access by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 610, in these examples, provides for communications with other data processing systems or devices, including resources of network infrastructure 100 and other devices (not shown). In these examples, communications unit 610 includes one or more network interface cards. Communications unit 610 may provide communications through the use of either or both physical and wireless communications links. Store alternate WWPN program 180 and/or engage alternate WWPN program 181 may be downloaded to persistent storage 608, of SCSI initiator host computer 105, through communications unit 610 of SCSI initiator host computer 105.

I/O interface(s) 612 allows for input and output of data with other devices that may be connected to SCSI initiator host computer 105, CEC 115a, CEC 115b, and HMC computer 127. For example, I/O interface 612 may provide a connection to external devices 618 such as a keyboard, keypad, a touch screen, and/or some other suitable input device. External devices 618 can also include portable computer-readable storage media such as, for example, thumb drives, portable optical or magnetic disks, and memory cards. Software and data used to practice embodiments of the present invention, e.g., store alternate WWPN program 180 and/or engage alternate WWPN program 181, can be stored on such portable computer-readable storage media and can be loaded onto persistent storage 608 of SCSI initiator host computer 105, via I/O interface(s) 612 of SCSI initiator host computer 105. I/O interface(s) 612 also connect to a display 620.

Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for communicating in a computing environment, the computer program product comprising:
   one or more computer-readable storage media and program instructions stored on the one or more computer-readable storage media, the program instructions comprising:
   program instructions for a first computer to establish communication with a first virtual computer through a first virtual port using a primary port name for the first virtual port, wherein the first virtual computer is executing on a second computer;
   program instructions for the first computer to acquire a previously unknown alternate port name for the first virtual port from the first virtual computer executing on the second computer prior to migration, wherein the program instructions for the first computer to acquire an alternate port name for the first virtual port from the first virtual computer executing on the second computer comprises program instructions for the first computer to issue an SCSI inquiry command to a virtual SCSI device for the alternate port name for the first virtual port;
   program instructions to, responsive to receiving a state change notification, program instructions for the first computer to determine that the first virtual computer is not accessible using the primary port name for the first virtual port, wherein the first virtual computer is migrated to execute on a third computer; and
   program instructions for the first computer to reestablish communication with the migrated first virtual computer executing on the third computer using the alternate port name of the first virtual port.

2. The computer program product of claim 1, wherein the alternate port name for the first virtual port is stored on the first virtual computer in an extended vital product data page.

3. The computer program product of claim 2, wherein the extended vital product data page is stored in a virtual small computer system interface (SCSI) device on the first virtual computer.

4. The computer program product of claim 1, wherein the first virtual computer is a virtualized logical partition in a cluster environment.

5. The computer program product of claim 1, wherein the first virtual port is a Virtual Fibre Channel port.

6. The computer program product of claim 1, wherein the program instructions for the first computer to determine that the first virtual computer is not accessible using the primary port name for the first virtual port, wherein the first virtual computer is migrated to execute on a third compute comprise:
   program instructions for the first computer to send a communication to the first virtual port using the primary port name; and
   program instructions for the first computer to receive an error indicating that the first virtual port is not accessible using the primary port name.

7. A computer system for communicating in a computing environment, the computer system comprising:
   one or more computer processors, one or more computer-readable storage media, and program instructions stored on the computer-readable storage media for execution by at least one of the one of the one or more processors, the program instructions comprising:
   program instructions for a first computer to establish communication with a first virtual computer through a first virtual port using a primary port name for the first virtual port, wherein the first virtual computer is executing on a second computer;
   program instructions for the first computer to acquire a previously unknown alternate port name for the first virtual port from the first virtual computer executing on the second computer prior to migration, wherein the program instructions for the first computer to acquire an alternate port name for the first virtual port from the first virtual computer executing on the second computer comprises program instructions for the first computer to issue an SCSI inquiry command to a virtual SCSI device for the alternate port name for the first virtual port;
   program instructions to, responsive to receiving a state change notification, program instructions for the first computer to determine that the first virtual computer is not accessible using the primary port name for the first virtual port, wherein the first virtual computer is migrated to execute on a third computer; and
   program instructions for the first computer to reestablish communication with the migrated first virtual computer executing on the third computer using the alternate port name of the first virtual port.

8. The computer system of claim 7, wherein the alternate port name for the first virtual port is stored on the first virtual computer in an extended vital product data page.

9. The computer system of claim 8, wherein the extended vital product data page is stored in a virtual small computer system interface (SCSI) device on the first virtual computer.

10. The computer system of claim 7, wherein the first virtual computer is a virtualized logical partition in a cluster environment.

11. The computer system of claim 7, wherein the first virtual port is a Virtual Fibre Channel port.

* * * * *